(12) United States Patent
Lee et al.

(10) Patent No.: US 10,607,791 B2
(45) Date of Patent: Mar. 31, 2020

(54) ENERGY STORAGE DEVICE

(71) Applicant: LS Mtron Ltd., Anyang-si, Gyeonggi-do (KR)

(72) Inventors: Jung-Gul Lee, Anyang-si (KR); Yong-Hyeon Yoo, Incheon (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 273 days.

(21) Appl. No.: 15/544,602

(22) PCT Filed: Jan. 18, 2016

(86) PCT No.: PCT/KR2016/000502
§ 371 (c)(1),
(2) Date: Jul. 19, 2017

(87) PCT Pub. No.: WO2016/117888
PCT Pub. Date: Jul. 28, 2016

(65) Prior Publication Data
US 2018/0012707 A1    Jan. 11, 2018

(30) Foreign Application Priority Data
Jan. 21, 2015    (KR) .................. 10-2015-0010103

(51) Int. Cl.
*H01G 11/82* (2013.01)
*H01G 11/76* (2013.01)
(Continued)

(52) U.S. Cl.
CPC ............. *H01G 11/82* (2013.01); *H01G 2/106* (2013.01); *H01G 4/228* (2013.01); *H01G 4/40* (2013.01);
(Continued)

(58) Field of Classification Search
CPC ........ H01G 11/10; H01G 11/78; H01G 11/14; H01G 11/82; H01G 11/08; H01G 11/76;
(Continued)

(56) References Cited

U.S. PATENT DOCUMENTS 6,327,137 B1    12/2001    Yamamoto et al.
6,979,502 B1 *  12/2005    Gartstein ............ H01M 6/5044
                                                        429/176
(Continued)

FOREIGN PATENT DOCUMENTS

CN        102832053 A       12/2012
DE    102006005532 A1 *   8/2007    ............. H01G 9/008
(Continued)

OTHER PUBLICATIONS

Search Report, dated Apr. 28, 2016, for International Application No. PCT/KR2016/000502.
(Continued)

*Primary Examiner* — David M Sinclair
(74) *Attorney, Agent, or Firm* — K&L Gates LLP

(57) ABSTRACT

An energy storage device includes: an external terminal having any one of positive and negative polarities and including a protrusion and a first terminal; a case having a polarity opposite to the external terminal and including an extension; a substrate disposed to surround an outer circumference of the protrusion of the external terminal through a hole formed at a center thereof; and a connection member located at an upper surface of the substrate and coupled to the first terminal of the external terminal, wherein the first terminal and the substrate are connected by means of the connection member, and the extension is connected to the substrate. Since positive and negative electrodes of the energy storage device are electrically connected to a substrate having a cell balancing function without a harness or
(Continued)

any other member, it is possible to improve the economic feasibility and productivity of the energy storage device module.

6 Claims, 5 Drawing Sheets

(51) Int. Cl.
    *H01G 11/08*     (2013.01)
    *H01G 9/008*     (2006.01)
    *H01G 9/06*     (2006.01)
    *H01M 2/02*     (2006.01)
    *H01G 2/10*     (2006.01)
    *H01G 4/228*     (2006.01)
    *H01G 4/40*     (2006.01)
    *H01G 11/10*     (2013.01)

(52) U.S. Cl.
    CPC .............. *H01G 9/008* (2013.01); *H01G 9/06* (2013.01); *H01G 11/08* (2013.01); *H01M 2/022* (2013.01); *H01G 11/10* (2013.01); *H01G 11/76* (2013.01); *Y02E 60/13* (2013.01); *Y02T 10/7022* (2013.01)

(58) Field of Classification Search
    CPC . H01G 11/74; H01G 9/06; H01G 9/08; H01G 4/228; H01G 4/40; H01G 2/106; H01M 2/022
    See application file for complete search history.

(56) References Cited

U.S. PATENT DOCUMENTS

| | | | |
|---|---|---|---|
| 7,029,787 B2 * | 4/2006 | Bando | H01M 2/1077 |
| | | | 429/156 |
| 8,119,281 B2 * | 2/2012 | Kim | H01M 2/0413 |
| | | | 429/178 |
| 8,748,020 B2 | 6/2014 | Lee et al. | |
| 2005/0070164 A1 * | 3/2005 | Mita | H01M 2/204 |
| | | | 439/627 |
| 2005/0250006 A1 * | 11/2005 | Kim | H01M 2/18 |
| | | | 429/160 |
| 2006/0264108 A1 | 11/2006 | Shinamori et al. | |
| 2007/0139863 A1 | 6/2007 | Tharp | |
| 2007/0253146 A1 * | 11/2007 | Inoue | H01G 2/04 |
| | | | 361/328 |
| 2008/0160392 A1 * | 7/2008 | Toya | H01M 2/027 |
| | | | 429/90 |
| 2013/0149919 A1 * | 6/2013 | Lee | H01G 9/26 |
| | | | 439/765 |
| 2015/0279574 A1 * | 10/2015 | So | H01G 11/04 |
| | | | 361/502 |
| 2016/0189883 A1 | 6/2016 | Yoo et al. | |

FOREIGN PATENT DOCUMENTS

| | | | |
|---|---|---|---|
| EP | 1058332 | A2 | 12/2000 |
| EP | 1139463 | A2 | 10/2001 |
| JP | 199879332 | A | 3/1998 |
| JP | H11339761 | A | 12/1999 |
| JP | 200185281 | A | 3/2001 |
| JP | 2002246006 | | 8/2002 |
| JP | 2004265722 | A * | 9/2004 |
| JP | 3644560 | B2 * | 4/2005 |
| JP | 201289689 | A | 5/2012 |
| JP | 2016533035 | A | 10/2016 |
| KR | 10-0799795 | B1 | 1/2008 |
| KR | 100799795 | B1 | 1/2008 |
| KR | 10-2011-0091323 | A | 8/2011 |
| KR | 10-1211916 | B1 | 12/2012 |
| KR | 10-1296224 | B1 | 9/2013 |
| KR | 1020130092437 | | 12/2013 |
| WO | 2011021253 | A1 | 2/2011 |

OTHER PUBLICATIONS

Written Opinion, dated Apr. 28, 2016, for International Application No. PCT/KR2016/000502.

* cited by examiner

ENERGY STORAGE DEVICE

CROSS-REFERENCE TO RELATED APPLICATION(S)

The present application is a U.S. National Phase entry from International Application No. PCT/KR2016/000502, filed Jan. 18, 2016, which claims priority to Korean Patent Application No. 10-2015-0010103, filed Jan. 21, 2015, the disclosure of which is incorporated by reference herein in its entirety.

BACKGROUND OF THE INVENTION

1. Field of the Invention

The present disclosure relates to an energy storage device.

2. Description of Related Art

A high capacitance storage device, which is regarded as a next-generation electric energy storage device, includes a ultra-capacitor (UC), a super capacitor (SC), an electric double layer capacitor (EDLC) and the like, which are a kind of capacitor, and it is an energy storage device having an intermediate property between an electrolytic condenser and a secondary battery, which can be used in combination with, or in place of, a secondary battery due to its high efficiency and semi-permanent life span.

The high capacitance storage device is sometimes used in place of a battery for applications which do not ensure easy maintenance and demand long service life. The high capacitance storage device has fast charging/discharging characteristics and thus is very suitable not only as an auxiliary power source for mobile communication information devices such as a mobile phone, a notebook and a PDA but also as a main or auxiliary power source of an electric vehicle, a night road pilot lamp, an uninterrupted power supply (UPS) and the like, which demand high capacity, and is widely used for such purposes.

When applying the high capacitance storage device, a high voltage module of several thousand Farads or several hundred volts is required to be used as a high voltage cell. The high voltage module may be obtained by connecting as many high capacitance storage devices as needed. At this time, each cell module is configured as an assembly in which external terminals are connected by a bus bar or nut.

In the high capacitance storage device module, the voltage among cells becomes unbalanced during charging, standing-by and discharging, which accelerates the aging of the cells and deteriorates the state of charge of the cell to shorten the life span. Also, the cells may come into an overvoltage condition and then be destroyed or exploded. Therefore, the high capacitance storage device module demands cell balancing to control the voltage balance among the cells.

To solve this problem, as shown in FIG. 1, there has been proposed a high capacitance storage device module 3, which includes a plurality of high capacitance storage devices 110, 210 connected by a connection member 130 and a plurality of balancing circuit boards 120, 220 respectively connected to the high capacitance storage devices 110, 210 to control voltages of the high capacitance storage devices 110, 210.

The high capacitance storage device module 3 electrically connects a − terminal 112 of any one high capacitance storage device 110 and a + terminal 314 of another high capacitance storage device (not shown) by means of a nut-shaped connection member 130. In addition, the high capacitance storage device module 3 electrically connects a + terminal 114 of any one high capacitance storage device 110 and a − terminal 212 of another high capacitance storage device 210 by means of a nut-shaped connection member 130.

Meanwhile, in order to control the voltages of the high capacitance storage devices 110, 210 through the respective balancing circuit boards 120, 220, the balancing circuit boards 120, 220 and the high capacitance storage devices 110, 210 should be electrically connected. For this, the existing high capacitance storage device module 3 receives a + current by connecting a plurality of connectors 122, 222 respectively coupled to the balancing circuit boards 120, 220 to a plurality of harnesses 140, and receives a − current as the balancing circuit boards 120, 220 are supported by a support member 150 to contact a plurality of connection members 130, thereby electrically connecting the balancing circuit boards 120, 220 and the high capacitance storage devices 110, 210, respectively.

However, when using the high capacitance storage device module 3 using the plurality of connectors 122, 222 and the plurality of harnesses 140, the connectors 122, 222 may not be connected due to an operator's mistake, and the support member 150 may not properly support each of the balancing circuit boards 120, 220 and thus fail to supply a current to each of the balancing circuit boards 120, 220. In addition, the performance of the high capacitance storage device module 3 may be deteriorated due to the heat generated at the plurality of harnesses 140, and the harness 140 may be interposed between the high capacitance storage devices 110, 120 so that its sheath may be peeled off or cut off. Also, the plurality of connectors 122, 222 and the plurality of harnesses 140 may increase a unit price.

SUMMARY OF THE INVENTION

The present disclosure is designed to solve the problems of the related art, and therefore the present disclosure is directed to providing an energy storage device having an improved structure to electrically connect − terminals and + terminals of energy storage devices to a balancing circuit board without any harness or connector.

In one aspect of the present disclosure, there is provided an energy storage device, comprising: an external terminal having any one of positive and negative polarities and including a protrusion and a first terminal; a case having a polarity opposite to the external terminal and including an extension; a substrate disposed to surround an outer circumference of the protrusion of the external terminal through a hole formed at a center thereof; and a connection member located at an upper surface of the substrate and coupled to the first terminal of the external terminal, wherein the first terminal and the substrate are connected by means of the connection member, and the extension is connected to the substrate.

Preferably, the energy storage device may further comprise a support member located between the substrate and the external terminal to support the substrate.

Preferably, the energy storage device may further comprise an insulation member installed between an upper surface of the external terminal and the extension to prevent the external terminal and the extension from being electrically connected.

Preferably, the substrate may include a cell balancing circuit for controlling a voltage of the energy storage device.

Preferably, the connection member may be connected to the first terminal to provide any one of a negative current and a positive current to the substrate, and the extension may provide a current with a polarity different from the connection member to the substrate.

Preferably, the extension may press a part of an upper surface of the external terminal to fix the external terminal to the inside of the case.

Preferably, the case may further include a second terminal, and the connection member may connect the first terminal of any one energy storage device and the second terminal of another energy storage device.

Preferably, the hole formed at the center of the substrate may have a diameter greater than a diameter of the protrusion and smaller than a diameter of the connection member.

Preferably, the energy storage device may be a high capacitance storage device.

Advantageous Effects

The energy storage device according to the present disclosure may electrically connect a positive electrode and a negative electrode of the energy storage device to a substrate having a cell balancing function without any connector or harness, and thus it is possible to reduce the cost required for preparing the harness and the connector, and it is also possible to improve the economic feasibility and productivity of the energy storage device module by omitting the process of installing the harness and the connector.

DETAILED DESCRIPTION OF THE INVENTION

Figure 1:
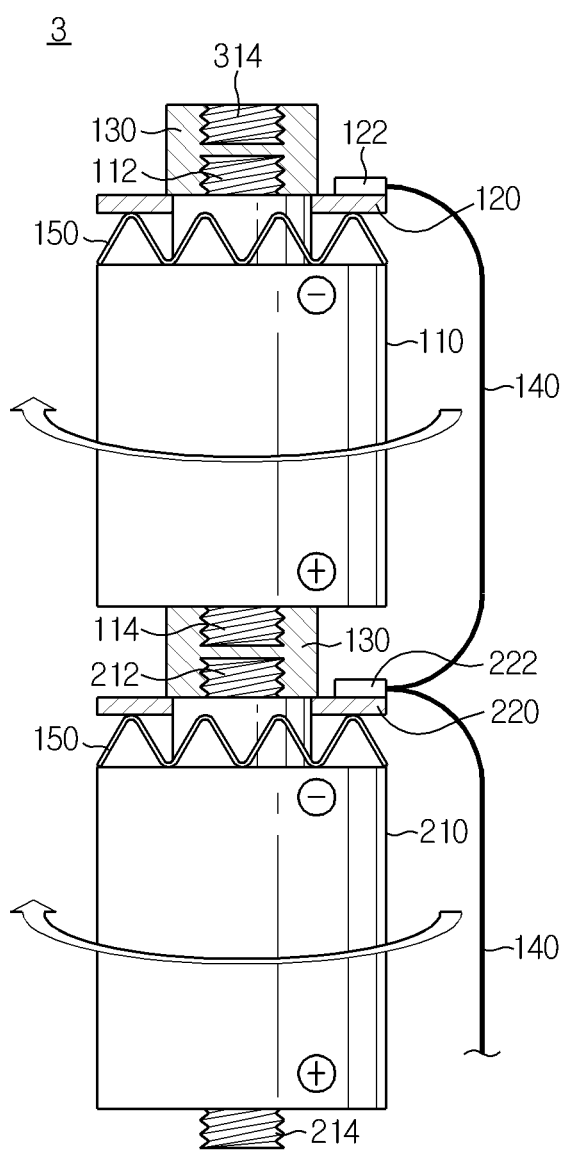
FIG. 1 is a schematic view showing a brief configuration of an existing energy storage device module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, each component or a specific portion of each component is depicted in an exaggerated, excluded or simplified state for the convenience of understanding and clarity. Therefore, the size of each component may not fully reflect an actual size. Also, any explanation of the prior art known to relate to the present invention may be omitted if it is regarded to render the subject matter of the present invention vague.

Figure 2:
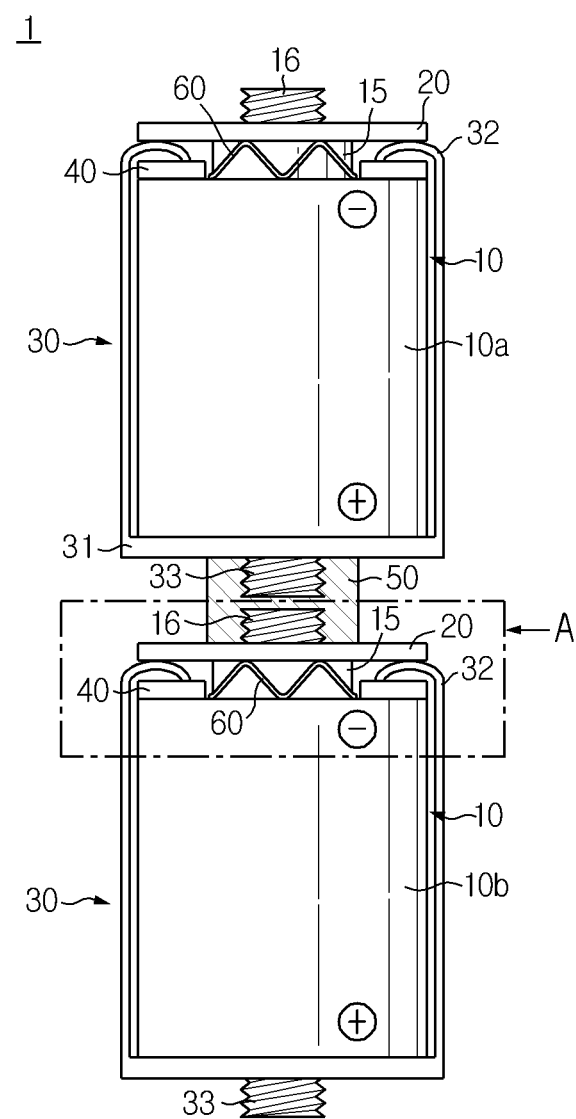
FIG. 2 is a schematic view showing a brief configuration of an energy storage device module according to an embodiment of the present disclosure.
Figure 3:
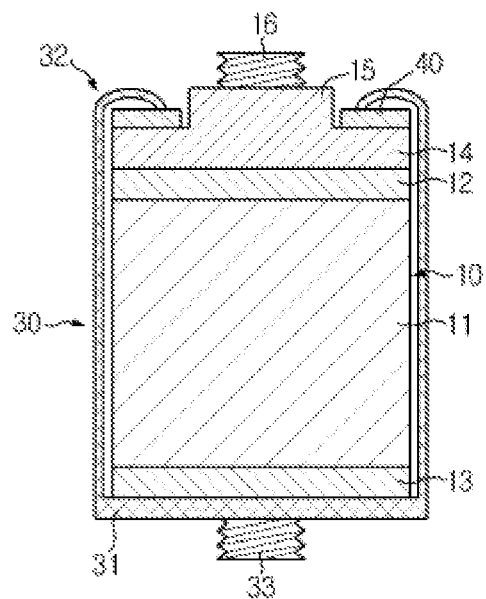
FIG. 3 is a cross-sectional view showing an energy storage device depicted in FIG. 2.

FIG. 2 is a schematic view showing a brief configuration of an energy storage device module according to an embodiment of the present disclosure, and FIG. 3 is a schematic view showing sections of an energy storage device and a case of the energy storage device of FIG. 2.

Referring to FIGS. 2 and 3, the energy storage device module 1 according to an embodiment of the present disclosure comprises an external terminal 14 connected to a negative electrode of a bare cell 11, having a negative polarity and including a first terminal 16; a case 30 connective to a positive electrode of the bare cell 11, having a positive polarity and including an extension 32 and a second terminal 33; a substrate 20 electrically connected to the first terminal 16 of the external terminal 14 and the extension 32 of the case 30, respectively; and a connection member 50 for connecting the second terminal 33 of any one energy storage device 10a and the first terminal 16 of another energy storage device 10b.

The energy storage device 10 is a device in which electric energy is stored, and may adopt a high capacitance storage device or various other devices. Hereinafter, the energy storage device module 1 according to an embodiment of the present disclosure will be described based on a case where the energy storage device 10 is a high capacitance storage device, for convenience in explanation.

The number of energy storage devices 10 is not particularly limited, and at least two energy storage devices 10 may be provided. If a plurality of energy storage devices 10 are provided, as shown in FIG. 2, the plurality of energy storage devices 10 may be connected in series by connecting the second terminal 33 of any one energy storage device 10a and the first terminal 16 of another energy storage device 10b in a longitudinal direction of the energy storage devices 10 by using the connection member 50.

The energy storage device 10 includes a bare cell 11 composed of an anode, a cathode, a separator and an electrolyte, a first internal terminal 12 coupled to one side of the bare cell 11 and electrically connected to a negative electrode of the bare cell 11, a second internal terminal 13 coupled to the other side of the bare cell 11 and electrically connected to a positive electrode of the bare cell 11, an external terminal 14 electrically connected to the first internal terminal 12 and coupled to the outer side of the first internal terminal 12 so that at least a portion of the external terminal 14 is exposed out of the case 30, and a case 30 electrically connected to the second internal terminal 13.

The external terminal 14 includes a protrusion 15 protruding from an upper surface thereof, and a first terminal 16 provided at an upper surface of the of the protrusion 15, having a thread formed along an outer circumference thereof and connecting any energy storage device to another energy storage device.

Since the first internal terminal 12 is electrically connected to the negative electrode of the bare cell 11, the first internal terminal 12 as well as the external terminal 14 and the first terminal 16 electrically connected to the first internal terminal 12 have a negative polarity, respectively. Also, since the second internal terminal 13 is electrically connected to the positive electrode of the bare cell 11, the second internal terminal 13 and the case 30 electrically connected to the second internal terminal 13 have a positive polarity. The case 30 includes the second terminal 33 protruding from a lower surface thereof to form a thread along an outer circumference and connecting adjacent energy storage devices 10. At least a portion of the case 30 is made of a conductive material, and the case 30 is forms an appearance of the energy storage device 10. Also, the case 30 is installed to surround at least a portion of the energy storage device 10. Therefore, if the substrate 20 is connected to external terminal 14, the substrate 20 receives a negative current from the external terminal 14, and if the substrate 20 is connected to the case 30, the substrate 20 receives a positive current from the case 30.

Figure 4:
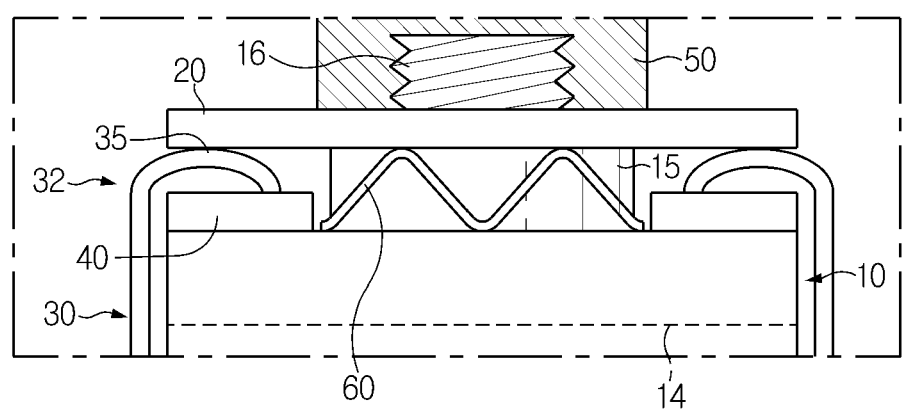
FIG. 4 is a partially enlarged view showing the energy storage device of FIG. 3.

FIG. 4 is a partially enlarged view showing the energy storage device module of FIG. 3.

The case 30 is at least partially made of a conductive material and is installed to surround at least a portion of the energy storage device 10 to form an appearance of the energy storage device 10. As shown in FIG. 3, the case includes a case body 31 electrically connected to the second internal terminal 13 and having a cylindrical body surrounding the bare cell 11 so that any one of an upper surface and a lower surface of the cylindrical body is closed, an extension 32 extending from the cylindrical body of the case body 31 and electrically connected to the substrate 20, and a second terminal 33 protruding from the case body 31 and electrically connected to the first terminal 16 of another energy storage device 10.

As shown in FIG. 3, a bottom of the case body 31, which closes the lower surface of the cylindrical body of the case body 31, is coupled to the lower surface of the second internal terminal 13 to be electrically connected to the second internal terminal 13. The cylindrical body of the case body 31 is formed to surround the bare cell 11 in a state spaced apart therefrom by a predetermined distance.

Since the case body 31 is electrically connected to the second internal terminal 13 having a positive polarity, the case body 31, the extension 32 extending from the case body 31, and the second terminal 33 protruding from the case body 31 have a positive polarity, respectively. Therefore, a positive current flows at the case 30.

The second terminal 33 is formed to protrude from the lower portion of the case body 31 and has a positive polarity. The second terminal 33 is connected to the first terminal 16 of another energy storage device 10 by means of the connection member 50. As shown in FIG. 3, a thread for screwing the connection member 50 is formed at the outer circumference of the second terminal 33.

In the present disclosure, it is described that the external terminal 14 has a negative polarity and the case 300 has a positive polarity. However, it is also possible that the external terminal 14 has a positive polarity and the case 300 has a negative polarity, opposite to the above.

As shown in FIG. 4, the extension 32 is formed by bending an end portion of the cylindrical body of the case body 31 and is positioned between the external terminal 14 and the substrate 20 to electrically connect the case 30 to the substrate 20. Also, the extension 32 presses a portion of the upper surface of the external terminal 14 exposed to the outside, thereby fixing the external terminal 14 inside the case 30. The shape of the extension 32 is not particularly limited. For example, as shown in FIG. 4, the extension 32 is formed by bending an end portion of the case body 31 to have a curved shape, and a portion thereof is electrically connected to the substrate 20 by contacting the lower surface of the substrate 20.

The insulation member 40 is disposed between the extension 32 and the external terminal 14 to prevent the electrical connection between the extension 32 and the external terminal 14. As the extension 32 is provided as above, the substrate 20 is connected to the positive electrode through the extension 32 having a positive polarity. If so, the substrate 20 may be connected to the positive electrode of the energy storage device 10 without any harness and connector member, thereby reducing the cost required for preparing the harness and connector member. Accordingly, the energy storage device module 1 according to the embodiment of the present disclosure may have enhanced market competitiveness and enhanced productivity since a manufacturing process for connecting the harness and the connector member to the substrate may be excluded.

Figure 5:
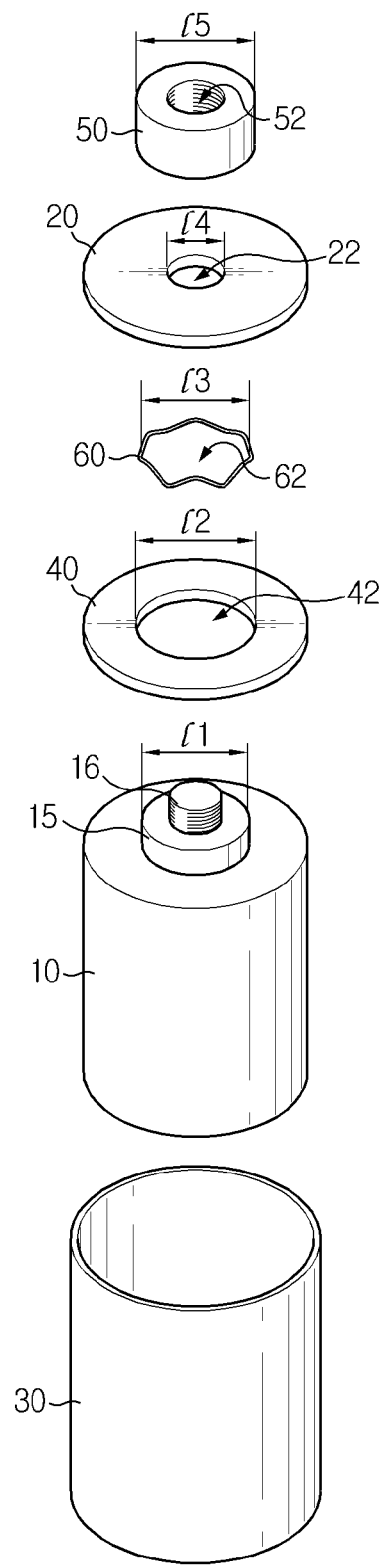
FIG. 5 is an exploded perspective view showing the energy storage device of FIG. 4.

FIG. 5 is an exploded perspective view showing the energy storage device of FIG. 2.

As shown in FIG. 4, a plurality of substrates 20 are provided, and one substrate 20 is installed at each energy storage devices 10. Each substrate 20 may have a circuit for cell balancing of each energy storage device 10. Each substrate 20 may be a printed circuit board (PCB), without being limited thereto.

The substrate 20 is installed to surround the outer circumference of the protrusion 15 of the external terminal 14. The lower surface of the substrate 20 is contacted and supported by a center 35 of the extension 32 and electrically connected to the case 30 with a positive polarity. The upper surface of the substrate 20 contacts the lower surface of the connection member 50 and is electrically connected to the first terminal 16 having a negative polarity.

A hole 22 having a diameter ($l_4$) greater than the diameter ($l_1$) of the protrusion 15 of the external terminal 14 is formed at the center of the substrate 20 so that the substrate 20 is installed to surround the outer circumference of the protrusion 15 of the external terminal 14. In addition, the hole 22 is formed to be smaller than the diameter ($l_5$) of the connection member 50 so that the substrate 20 may contact the connection member 50.

The substrate 20 is formed to have a diameter smaller than the diameter of the energy storage device 10 in order to avoid any interference with an adjacent energy storage device when the energy storage device 10 is modularized. Here, the modularization of the energy storage device 10 means that a plurality of energy storages 10 are electrically connected.

A support member 60 may be positioned between the substrate 20 and the external terminal 14 to support the center of the substrate 20 in order to prevent the center of the substrate 20 from bending toward the energy storage device 10. As shown in FIG. 5, the support member 60 is made of an elastic material and has a hole 62 having a diameter ($l_3$) greater than the diameter ($l_5$) of the protrusion 15 to surround the protrusion 15 of the external terminal 14. The support member 60 may also be a wave washer having a diameter smaller than the diameter ($l_2$) of the hole 42 of the insulation member 40.

Next, the connection member 50 is made of a conductive material and electrically connects any one energy storage device 10a to another energy storage device 10b. As shown in FIG. 5, the connection member 50 is includes a thread hole 52 having a nut shape with a thread and formed at the inner circumferential surface thereof so that the first terminal 16 and the second terminal 33 are screwed thereto. Thus, the connection member 50 may electrically the negative electrode of any energy storage device 10a and the positive electrode of another energy storage device 10b as shown in FIG. 4. Therefore, a plurality of energy storage devices 10 may be connected in series using the connection member 50.

Also, the connection member 50 has a diameter greater than the diameter ($l_4$) of the hole 22 of the substrate 20. Thus, as shown in FIG. 4, the lower surface of the connection member 50 may be in electrical contact with the upper surface of the substrate 20, and by doing so, the first terminal 16 and the substrate 20 may be electrically connected via the connection member 50.

Figure 6:
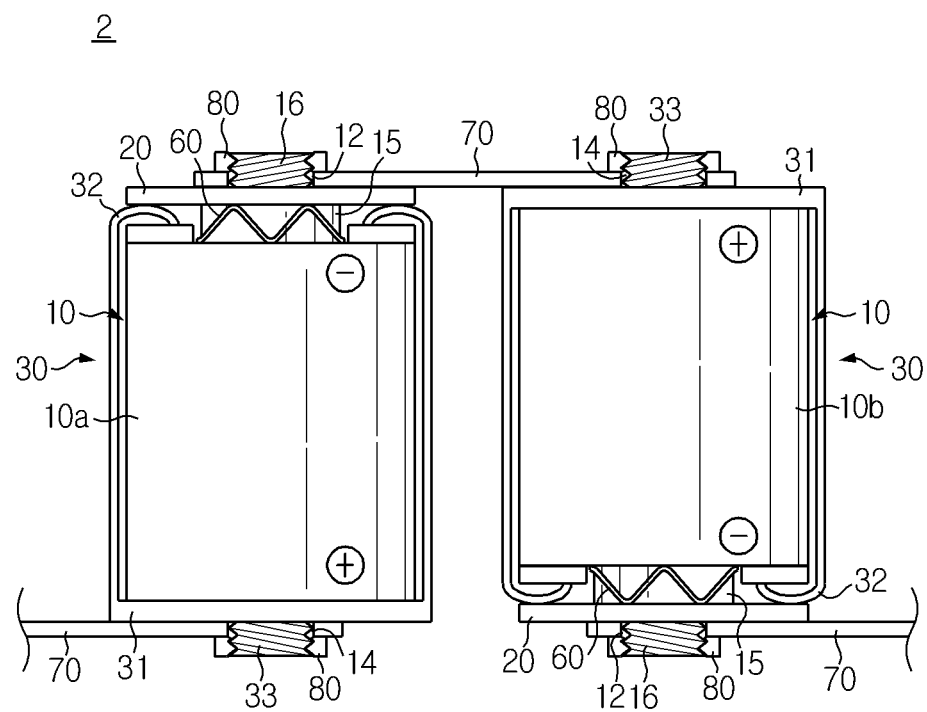
FIG. 6 is a schematic view showing a brief configuration of an energy storage device module according to another embodiment of the present disclosure.
Figure 7:
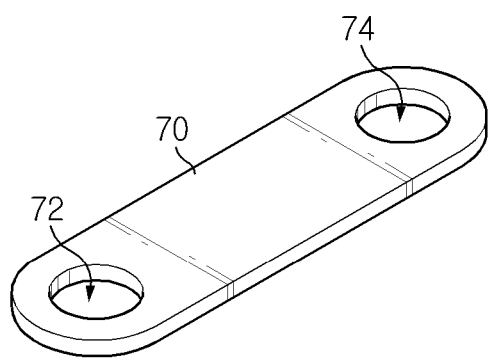
FIG. 7 is a perspective view showing a connection member depicted in FIG. 6.

FIG. 6 is a schematic view showing a brief configuration of an energy storage device module according to another embodiment of the present disclosure, and FIG. 7 is a perspective view showing a connection member depicted in FIG. 6.

A basic configuration of an energy storage module 2 according to this embodiment of the present disclosure is identical to that of the energy storage device module 1 according to the former embodiment of the present disclosure described above, but the energy storage module 2 according to this embodiment differs from the energy storage module 1 according to the former embodiment of the present disclosure in view of the arrangement and connection way of the energy storage device 10. Hereinafter, the same components as those of the energy storage device module 1 according to the former embodiment of the present disclosure will be described using the same reference numerals for convenience of explanation.

As shown in FIG. 6, a plurality of energy storage devices 10 are arranged side by side at a predetermined interval in the width direction of the energy storage devices 10, and the first terminal 16 of any one energy storage device 10a and the second terminal 33 of another energy storage device 10b adjacent to the energy storage device 10a are disposed to be located on the same line.

In order to electrically connect the first terminal 16 of any one energy storage device 10a and the second terminal 33 of another energy storage device 10b, as shown in FIG. 6, the energy storage device module 2 according to this embodiment of the present disclosure includes a connection member 70.

As shown in FIG. 7, the connection member 70 has a bar shape and includes a pair of fitting holes 72 and 74 in which the first terminal 16 of any one energy storage device 10a and the second terminal 33 of another energy storage device 10b are fitted, respectively. Thus, as shown in FIG. 6, the energy storage devices 10 may be connected in series by installing the connection member 70 so that the first terminal 16 of any one energy storage device 10a and the second terminal 33 of another energy storage device 10b are respectively fitted into the pair of fitting holes 72, 74.

In addition, as shown in FIG. 6, nuts 80 are screwed to the upper portion of the first terminal 16 and the upper portion of the second terminal 33, which pass through the fitting holes 72, 74 of the connection member 70, respectively, and by doing to, it is possible to prevent the connection member 70 from being deviated. In the present disclosure, it is described that the connection member 70 is installed to fix the first terminal 16 of any one energy storage device 10a and the second terminal 33 of another energy storage device 10b, and the nuts 80 are used to fix the connection member 70. However, the connection member 70 may also be fixed by means of welding or the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An energy storage device comprising:
   an external terminal having any one of positive and negative polarities and including a protrusion and a first terminal;
   a case having a polarity opposite to the external terminal and including an extension;
   a substrate disposed to surround an outer circumference of the protrusion of the external terminal through a hole formed at a center thereof and including a cell balancing circuit for controlling a voltage of the energy storage device; and
   a conductive connection member electrically connecting between the substrate and the first terminal by being in contact with an upper surface of the substrate and being coupled to the first terminal of the external terminal,
   wherein the extension is electrically connected to the substrate by being in contact with a lower surface of the substrate,
   wherein the extension presses a part of an upper surface of the external terminal to fix the external terminal to the inside of the case,
   wherein the case further includes a second terminal, and
   wherein the conductive connection member connects the first terminal of the energy storage device and the second terminal of another energy storage device.

2. The energy storage device according to claim 1, further comprising a support member located between the substrate and the external terminal to support the substrate.

3. The energy storage device according to claim 1, further comprising an insulation member installed between an upper surface of the external terminal and the extension to prevent the external terminal and the extension from being electrically connected.

4. The energy storage device according to claim 1,
   wherein the conductive connection member is connected to the first terminal to provide any one of a negative current and a positive current to the substrate, and
   wherein the extension provides a current with a polarity different from the conductive connection member to the substrate.

5. The energy storage device according to claim 1, wherein the hole formed at the center of the substrate has a diameter greater than a diameter of the protrusion and smaller than a diameter of the conductive connection member.

6. The energy storage device according to claim 1, wherein the energy storage device is a high capacitance storage device.

* * * * *